March 25, 1930. L. N. BRILLOUIN 1,752,228
DEVICE FOR PRODUCING AN ELECTRIC DISCHARGE
Filed Jan. 25, 1928   3 Sheets-Sheet 1
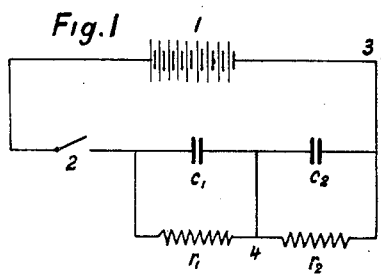
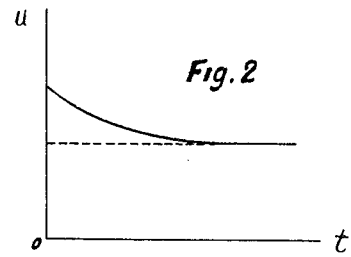
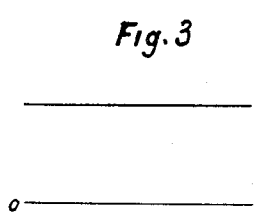
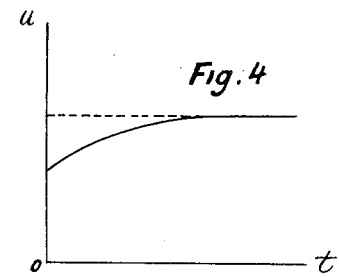
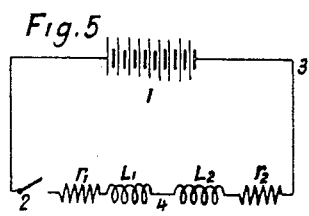
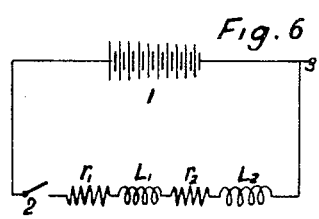
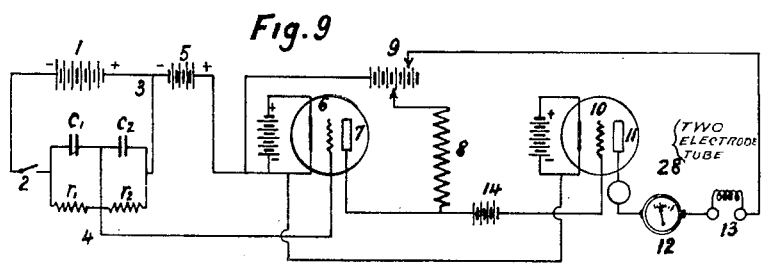
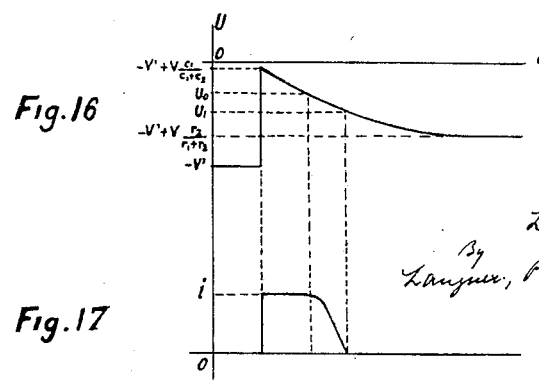

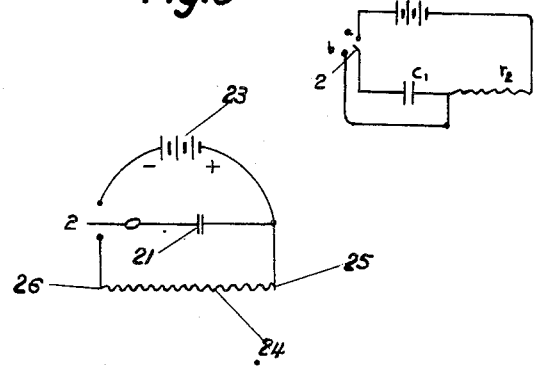
Fig. 7
Fig. 8
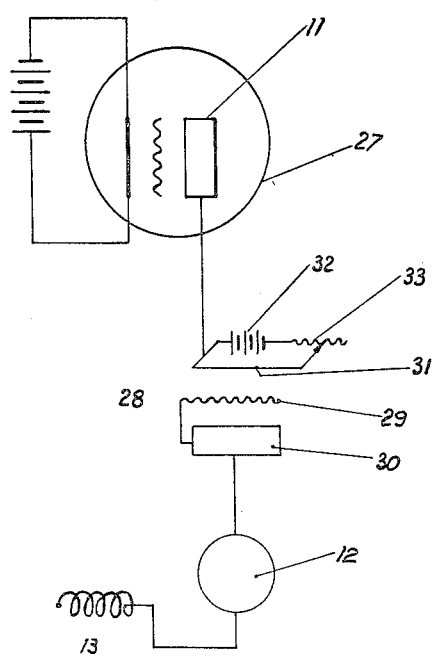
Fig. 18

March 25, 1930.  L. N. BRILLOUIN  1,752,228
DEVICE FOR PRODUCING AN ELECTRIC DISCHARGE
Filed Jan. 25, 1928  3 Sheets-Sheet 3
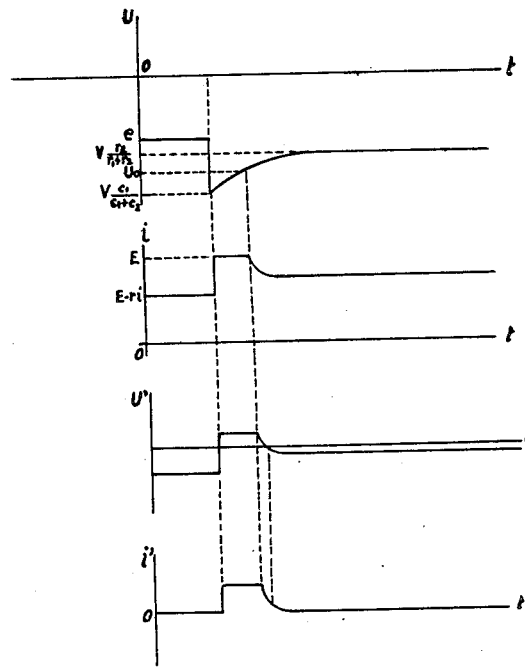
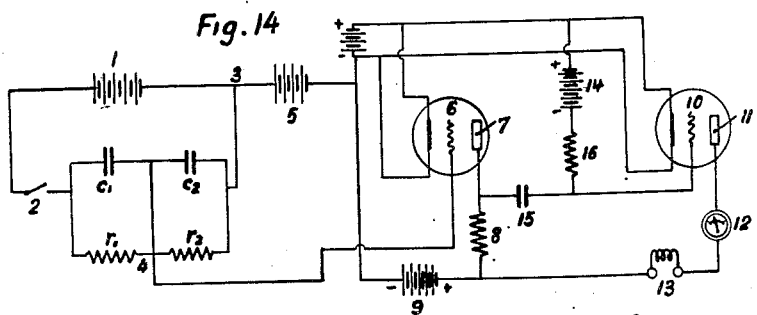
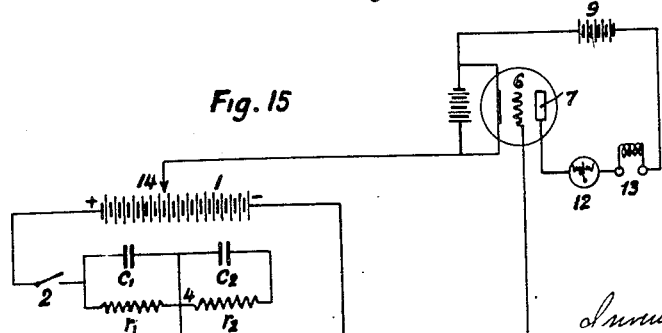

Patented Mar. 25, 1930

1,752,228

UNITED STATES PATENT OFFICE

LÉON NICOLAS BRILLOUIN, OF PARIS, FRANCE

DEVICE FOR PRODUCING AN ELECTRIC DISCHARGE

Application filed January 25, 1928, Serial No. 249,468, and in France March 8, 1927.

It is sometimes of interest to produce a current of constant intensity for a predetermined adjustable duration which may be very short; this is the case for instance for certain methods of medical diagnostic, especially in the case of chronaxis, according to which direct current is caused to excite a muscle after which its intensity is made to decrease gradually until the muscle ceases responding, and a current of double the intensity of the first current is made to pass in the muscle. The measure made is that of the time elapsed before the muscle is again responsive.

My invention has for its object a method for producing currents of constant intensity and predetermined adjustable duration, this duration being very small and having a range from less than $\frac{1}{100,000}$ second to several seconds. It consists in the use of a closed circuit provided with capacity and resistance or inductance so as to obtain a potential starting suddenly from a certain value and reaching more or less speedily another, the variation depending on the values of the capacity and resistances or inductances. One or more vacuum tubes are provided, the characteristic curve of which (the abscissæ being as usual the grid potential and the ordinates the plate current intensity) is S-shaped and rises from the axis of abscissæ corresponding to zero current to a horizontal line corresponding to the current of saturation.

I have described hereinbelow and shown on appended drawings, by way of example several forms of execution of my invention.

Fig. 1 shows diagrammatically a form of execution of my special circuit.

Figs. 2, 3 and 4 are diagrams of the variations of potential of a point of this circuit.

Figs. 5, 6, 7 and 8 show other forms of execution of the circuit.

Fig. 9 is a wiring diagram of the whole device.

Figs. 10, 11, 12 and 13 give the variations of potential at different points of the device.

Figs. 14 and 15 show diagrammatically other forms of execution of the device.

Figs. 16 and 17 are curves relating to the working of the apparatus shown on Fig. 13.

Fig. 18 illustrates a manner of connecting a vacuum tube with only two electrodes in the circuit of the last vacuum tube with three electrodes.

Fig. 1 shows a circuit adapted to give a variable potential at a given point. It comprises a battery 1, a switch 2 and two condensers having capacities $C_1$ and $C_2$ and disposed in series. These condensers are respectively shunted by resistances without inductance $r_1$ and $r_2$. If I take for zero the potential of point 3, V being the electromotive force of the battery, when the switch 2 is first closed and the current loads the condensers, the point 4 will be given a potential.

$$V = \frac{C_1}{C_1 + C_2}$$

After this the condensers will partially discharge through the resistances and after a variable period, theorically infinite and practically rather short, a steady state of the current shall be reached; under these conditions the potential of point 4 will have a variable value $u$ of which it is easy to draw the representative curve, the ordinates being $u$ and the abscissæ the time $t$ elapsed from the moment of the closing of the switch 2.

Calculation shows that the equation of the curve is:

$$\frac{u}{v} = \frac{r^2}{r_1 + r_2} + \left(\frac{C_1}{C_1 + C_2} - \frac{r^2}{r_1 + r_2}\right)e^{-\frac{t}{T}}$$

T being equal to $\dfrac{C_1 + C_2}{\dfrac{1}{r_1} + \dfrac{1}{r_2}}$

The horizontal line $u = \dfrac{r^2}{r_1 + r_2}$ will thus be an asymptote to the curve.

According as to whether $\dfrac{r^2}{r_1 + r_2}$ is greater, smaller or equal to $\dfrac{C_1}{C_1 + C_2}$ the asymptote will be above or underneath or will pass through the starting point and the curve will have one of the three shapes shown on Figs. 2, 3 and 4.

It should be noted that if $C_1$, $C_2$, $r_1$ and $r_2$ are caused to vary, the proportions $\frac{C^1}{C_2}$ and $\frac{r^1}{r_2}$ remaining constant, the starting point and the asymptote will not change but the shape of the curve will change and come more speedily near its asymptote when T becomes smaller; it is thus possible, by suitably choosing the capacities and resistances make $u$ reach a given value $u_0$ after a predetermined time $t_0$. It is easy to calculate the value of T adapted to provide this result.

It should be noted that the battery must not show any substantial inner resistance for the device to work exactly as stated.

The same result could be obtained with other connections for instance with those shown on Figs. 5 and 6 wherein the condensers are replaced by induction coils $L_1$ and $L_2$ inserted in series with the resistances $r_1$ and $r_2$. The potential of point 4 varies then from:

$$V\frac{L_2}{L_1+L_2} \text{ to } V\frac{r^2}{r_1+r_2}.$$

The time constant may be varied as precedently without changing the starting point nor the asymptote of the curve, provided the proportions $\frac{L_1}{L_2}$ and $\frac{r_1}{r_2}$ remain constant.

I may obtain approximately the same result by using resistances of very greatly different lengths and making one of them only stationary or else by having one adjustable condenser and one non-adjustable comparatively very small condenser.

For instance $r_2$ may be adjustable and $r_1$ nonadjustable and very much greater than the maximum value of $r_2$ (for instance $r_1 > 100 r_2$) or else $C_1$ being adjustable, $C_2$ is nonadjustable with $$C_2 < \frac{1}{100} C_1$$

The result is a great simplification of adjustment because $C_2$ and $r_1$ being non variable, the time constant is simply $T = C_1 r_2$.

On the contrary, with this arrangement when the switch 2 on Fig. 1 is opened, the condensers remain loaded and the condenser $C_1$ takes a very long time $T^1 = C_1 r_1$ for unloading. It is therefore of advantage in this case to short circuit it so as to avoid the consequent loss of time. If this simplification is pushed to extremes, $r_1$ being infinite and $C_2$ equal to zero the wiring diagram will be that shown on Fig. 7 wherein the switch 2 comes into contact successively with the contact $a$ for loading the condenser $C_1$ and with the contact $b$ for unloading and short circuiting it.

I may also use different connections comprising as shown on Fig. 8 only one capacity and resistance. The capacity 21 is adapted to be connected through switch 2 first with the battery 23 which loads it and then to the resistance 24 in order to unload it. The difference of potential between the ends 25 and 26 of this resistance is first zero. It becomes suddenly very great and negative at the moment when the circuit of condenser 1 is closed on resistance 4; it returns to zero according to an exponential law, this variation being represented by a curve similar to that shown on Fig. 10.

Any of the above described circuits may act on vacuum tubes so as to provide a current of constant intensity during the time the potential of point 4 takes to pass from its initial value (corresponding to the closing of 2) to a predetermined value, which time may be adjusted at will as stated hereinabove.

Fig. 9 shows a simple form of execution with two vacuum tubes. The point 3 of the discharge circuit is connected with the negative pole of the filament heating battery supposed to be at potential zero though a battery 5 having an electromotive force $e$ and the negative pole of which is connected with point 3.

The point 4 of the discharge circuit is connected with the grid of the first vacuum tube the plate 7 of which is connected with the heating battery through the resistance 8 having a value R and the battery 9 having an electromotive force E; the plate 7 is connected with the grid 10 of the second vacuum tube through a battery 14 having an electromotive force $e'$ which brings the potential of the grid 10 to a suitable value. The plate 11 of the second vacuum tube is connected with a point at a suitable positive potential of battery 9 through a current indicator 12 (ballistic galvanometer or wattmeter for instance) and the utilization circuit 13.

Between the plate 11 and the current indicator 12 may be inserted a two electrode vacuum tube 28 to be described later on.

When the switch 2 is open, the point 4 is at the potential $e$; when the switch 2 is closed, the potential passes suddenly to the value $$-e - V\frac{C^1}{C_1+C_2}$$

and diminishes then in absolute value down to the value $$-e - V\frac{r_2}{r_1+r_2}$$

Fig. 10 shows the manner in which this potential varies. When a current of intensity $i$ passes through the plate circuit of the first vacuum tube, the potential of this plate 7 is $E - Ri$. However this current $i$ exists only when the potential $u_1$ of the grid is above a certain value $u_0$; it is easy to adjust the device for $u_0$ to be intermediate between the extreme values of $u_1$ as shown on Fig. 10. Under these conditions the variations of the plate potential are as follows and are illustrated by the curve of Fig. 11. At the beginning the plate has a certain potential $E-Ri$; when the grid potential reaches the value $$-e-V\frac{C_1}{C_1+C_2}$$

below the critical value $u_0$, the current $i$ ceases passing in the corresponding plate circuit. The plate potential is thus E until current passes again through the plate circuit, that is as long as the grid potential is below $u_0$; at this moment the plate potential decreases to a value depending on the grid voltage and the characteristic curve of the tube. As long as the potential of the grid is below $u_0$ that is between $u_0$ and $$-e-V\frac{C_1}{C_1+C_2}$$

the potential of plate 7 remains constant. This duration of the constancy of its potential may be adjusted at will as explained hereinabove. The potential $u'$ of the grid 10 is equal to that of the plate 7 less $e'$ and its variation will be that shown on Fig. 12. This grid controls the plate current $i'$ of the second vacuum tube which current will remain constant during the time stated hereinabove and predetermined through the suitable adjustment of the values $C_1$ $C_2$ $r_1$ $r_2$. The potential $e'$ may moreover be determined in a manner such that the current has an intensity zero before the switch is closed and returns to zero before the potential of grid 10 reaches its final value. The variation of this current is then illustrated by the curve of Fig. 13. The current intensity is adjusted through the plate battery or the heating of the battery or again the variation of the grid battery 14.

The same result may be obtained by other connections, for instance those shown on Fig. 14 which is a modification of Fig. 9 wherein the two vacuum tubes are connected through the known "resistance and capacity" connection that is through a condenser 15, a leak resistance 16 being inserted in the circuit of the grid 10. The several batteries have been shown distinct for clearness sake on the drawings but of course some of them might be united into one.

Fig. 15 shows a diagram of connections using only one vacuum tube, the positive pole of battery 1 being connected in this case with the switch; if the pole of the heating battery is connected with a suitable point 14 of the battery 1 the grid is negatively polarized whilst the indicator 12 and the utilization circuit 13 are inserted in the plate circuit of the vacuum tube.

The working is as follows; if V is the total electromotive force of the battery 1 and $V^1$ the electromotive force of that part of the battery 1 which is comprised between the negative pole and the point 14, before the unloading of the condensers, the grid is brought to the potential $-V^1$; when the switch 2 is closed, the grid is suddenly brought to the potential $$-V^1+V\frac{C_1}{C_1+C_2}$$

and its potential decreases then according to an exponential law down to the value $$-V^1+V\frac{r^2}{r^1+r^2}$$

this variation is illustrated by Fig. 16. Means are provided for the grid to remain always negative whilst its potential decreases so that no current may pass through it. The time constant of the discharge circuit is then given by the value T given hereinabove.

The vacuum tube is adjusted in such a manner that the current fed by the plate is the current of saturation as long as the grid potential is above a certain value $u_0$ and that the said current has an intensity zero when the grid potential passes underneath $u_1$; the values $u_0$ and $u_1$ will remain in the range of potentials through which the grid passes during the unloading; $u_1$ in particular is greater than $V^1$ or than $$-V^1+V\frac{r^2}{r^2+r^1}.$$

Under these conditions the variation of the current fed by the plate of the vacuum tube is given by the curve shown on Fig. 17; the current intensity is first zero. It passes suddenly to the maximum value $i$ and keeps this value as long as the grid potential has not passed below $u_0$; then the current falls rapidly to zero whilst the grid potential passes from $u_0$ to $u_1$ after which the plate current remains at zero.

The current curve obtained in this manner is similar to that shown on Fig. 13 and comprises a horizontal line followed by a more or less downwardly inclined slope. The current fed may be adjusted through modification of the heating of the filament of the vacuum tube.

The diagrams shown on Figs. 9, 14 and 15 illustrate devices using the circuit shown on Fig. 1; but obviously one may use any other circuit having the same properties such as those shown diagrammatically on Figs. 5, 6 7 and 8; for the latter the points 25 and 26 play the same part as the points 3 and 4 of the circuit of Fig. 1.

It should be noted however that the latter connections show the drawback of requiring a somewhat rapid handling of the switch 2 so as to prevent the capacity 1 from having time to unload substantially whilst the switch passes from one contact to the next.

In the above described devices, it has been stated that the intensity of the current fed by the last vacuum tube may be adjusted through the adjustment of the heating of the filament of the said tube. It may be more handy to separate these two adjustments and to leave the heating constant. In view of this a two electrode vacuum tube is inserted in the utilization circuit and its filament is heated by a separate battery provided with a heating rheostat adapted to give a very gradual adjustment.

A form of execution of such an arrangement is shown on Fig. 18.

In the plate circuit 11 of the last vacuum tube is inserted a two electrode vacuum tube 28 which as shown is constituted by an ordinary vacuum tube the grid 29 and plate 30 of which are connected. The filament 31 is heated by the battery 32 properly insulated and provided with a heating rheostat 33 giving a very gradual adjustment. The plate 30 is connected through the current indicator 12 and the utilization circuit 13 with the feed battery, the remainder of the device being exactly similar to those described hereinabove.

The saturating current fed from the tube 28 will limit the current fed from the device. Its adjustment will therefore be provided through the heating rheostat 35. The tube 28 will always give the desired current, even if the electric supply varies in voltage. This allows the use, instead of batteries as disclosed hereinabove, of any supply giving a comparatively constant voltage, such as D. C. mains, rectified A. C., a dynamo machine, a converter etc.

In the examples shown on Figs. 9 and 14 it has been stated that the battery separating the discharge circuit from the neutral point of the device (the negative pole of the filament of the first vacuum tube) should be always connected through its positive pole with the said neutral point. But, according to the case the connection may be made through either pole and even the said battery may be suppressed.

When the devices disclosed are used for electric diagnostic the utilization circuit 13 (Figs. 9, 14 and 15) comprises two electrodes adapted to be put in contact with the muscle which it is desired to excite.

What I claim is:

1. A device for producing a current of constant intensity and predetermined and adjustable duration, this duration being very small and having a range from less than $\frac{1}{100.000}$ second to several seconds comprising a non-oscillatory circuit, means for producing suddenly in a point of said circuit a potential having a predetermined value and decreasing afterwards according to an exponential law to a second predetermined value, a vacuum tube comprising a filament, plate and grid, means for impressing the above mentioned potential on the grid of said vacuum tube in such a manner that this latter does not work on the straight and sloped part of the characteristic but on the curved parts and beyond, and a utilization circuit fed by current controlled through the plate circuit of the vacuum tube.

2. A device for producing a current of constant intensity and predetermined and adjustable duration, this duration being very small and having a range from less than $\frac{1}{100.000}$ second to several seconds comprising a non-oscillatory circuit, means for producing suddenly in a point of said circuit a potential having a predetermined value and decreasing afterwards according to an exponential law to a second predetermined value, a vacuum tube comprising a filament, plate and grid, means for impressing the above mentioned potential on the grid of said vacuum tube, means adapted to cause the plate current intensity to fall to zero during the exponential decrease of the above mentioned potential, a second vacuum tube, means for impressing the plate potential of the first vacuum tube on said second vacuum tube, in such a manner that the plate current of second tube exists only while the plate current of the first tube is zero, and a utilization circuit adapted to be fed by the current passing out of the second vacuum tube.

3. A device for producing a current of constant intensity and predetermined small duration having a range from less than $\frac{1}{100.000}$ second to several seconds duration comprising a circuit consisting of two condensers, a battery in series therewith, a resistance shunting each condenser and a switch in series with the condensers, means for producing suddenly in a point of said circuit between the condensers a potential having a predetermined value and decreasing afterwards according to an exponential law to a second predetermined value, a vacuum tube comprising a filament, plate and grid, means for impressing the above mentioned potential on the vacuum tube, means adapted to cause the plate current intensity to fall to zero during the exponential decrease of the above-mentioned potential, a second vacuum tube, means for impressing the plate potential of the first vacuum tube on said second vacuum tube and a utilization circuit adapted to be fed by the current passing out of the second vacuum tube.

4. A device for producing a current of constant intensity and predetermined small duration having a range from less than $\frac{1}{100.000}$ second to several seconds duration comprising a circuit consisting of two condensers, a battery in series therewith, a resistance shunting each condenser and a switch in series with the condensers, means for producing suddenly in a point of said circuit between the condensers a potential having a predetermined value and decreasing afterwards according to an exponential law to a second predetermined value, a vacuum tube comprising a filament, plate and grid, means for impressing the above mentioned potential on the grid of the vacuum tube, means adapted to cause the plate current intensity to fall to zero during the exponential decrease of the above mentioned potential, a resistance in the plate circuit, a second vacuum tube, means for impressing the plate potential of the first vacuum tube on the grid of said second vacuum tube and a utilization circuit adapted to be fed by the plate current of the second vacuum tube.

5. A device for producing a current of constant intensity and predetermined small duration having a range from less than $\frac{1}{100.000}$ second to several seconds duration comprising a circuit consisting of two condensers, a battery in series therewith, a resistance shunting each condenser and a switch in series with the condensers, means for producing suddenly in a point of said circuit between the condensers a potential having a predetermined value and decreasing afterwards according to an exponential law to a second predetermined value, a vacuum tube comprising a filament, plate and grid, means for impressing the above mentioned potential on the grid of the vacuum tube, means adapted to cause the plate current intensity to fall to zero during the exponential decrease of the above mentioned potential, a resistance in the plate circuit, a second vacuum tube, means for impressing the plate potential of the first vacuum tube on the grid of said second vacuum tube, a two electrode vacuum tube adapted to be fed by the plate circuit of the second vacuum tube, means for adjusting the heating of the two electrode vacuum tube, and a utilization circuit adapted to be fed by the current passing out of the two electrode tube.

In testimony whereof I have affixed my signature.

LÉON NICOLAS BRILLOUIN.